(12) United States Patent
Zollinger et al.

(10) Patent No.: US 7,059,129 B2
(45) Date of Patent: Jun. 13, 2006

(54) VARIABLE GEOMETRY TURBOCHARGER

(75) Inventors: Brent D. Zollinger, Bellflower, CA (US); Kevin P. Slupski, Redondo Beach, CA (US); Douglas H. Riethmeier, Huntington Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 95 days.

(21) Appl. No.: 10/671,751

(22) Filed: Sep. 25, 2003

(65) Prior Publication Data

US 2005/0066657 A1    Mar. 31, 2005

(51) Int. Cl.
*F02D 23/00* (2006.01)
*F01D 17/12* (2006.01)
*F01D 17/16* (2006.01)

(52) U.S. Cl. .................... 60/602; 415/163; 415/160

(58) Field of Classification Search .................. 60/602; 415/160, 163, 164, 150; 416/229 A, 229 R, 416/230
See application file for complete search history.

(56) References Cited

U.S. PATENT DOCUMENTS

| | | | |
|---|---|---|---|
| 3,232,581 A | 2/1966 | Swearingen | 415/163 |
| 3,495,921 A | 2/1970 | Swearingen | 415/163 |
| 3,645,645 A | 2/1972 | Gammill et al. | 415/163 |
| 4,300,869 A | 11/1981 | Swearingen | 415/160 |
| 4,502,836 A | 3/1985 | Swearingen | 415/160 |
| 4,935,277 A * | 6/1990 | Le Balc'h | 416/229 R |
| 5,127,802 A * | 7/1992 | Carlson et al. | 416/229 R |
| 5,439,353 A * | 8/1995 | Cook et al. | 416/229 R |
| 6,269,642 B1 | 8/2001 | Arnold et al. | 415/163 |
| 6,419,464 B1 | 7/2002 | Arnold | 415/163 |
| 6,547,520 B1 * | 4/2003 | Zinsmeyer et al. | 415/160 |
| 6,709,230 B1 * | 3/2004 | Morrison et al. | 416/229 A |
| 6,729,134 B1 * | 5/2004 | Arnold et al. | 60/602 |
| 2002/0094284 A1 | 7/2002 | Arnold | 417/407 |
| 2003/0014972 A1 | 1/2003 | Arnold | 60/602 |

OTHER PUBLICATIONS

PCT ISR/WO, Jan. 26, 2005.

* cited by examiner

*Primary Examiner*—Thai-Ba Trieu
(74) *Attorney, Agent, or Firm*—Chris James

(57) ABSTRACT

A variable geometry turbocharger includes vanes disposed therein having an inner airfoil surface oriented adjacent a turbine wheel, and an outer airfoil surface oriented opposite and parallel to the inner airfoil surface. The vane includes first and second axial surfaces that are each positioned perpendicular to and interposed between the inner and outer airfoil surfaces. A vane leading edge is positioned along a first inner and outer airfoil surface junction, and a trailing edge is positioned along a second inner and outer airfoil surface junction. One or more of the first and second axial surfaces have a composite construction comprising a solid section that extends a distance from the leading edge towards the trailing edge, and a cored-out section that extends a distance from the trailing edge towards the leading edge.

13 Claims, 7 Drawing Sheets

VARIABLE GEOMETRY TURBOCHARGER

FIELD OF THE INVENTION

This invention relates generally to the field of variable geometry turbochargers and, more particularly, to aerodynamic vanes that are movably disposed therein that are lightweight, when compared to conventional solid vanes, and that display low gas leakage, when compared to known non-solid vanes, thereby providing improved vane operation and extended vane/turbocharger service life.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas driven turbine to spin within the housing. The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In a turbocharger, it is often desirable to control the flow of exhaust gas to the turbine to improve the efficiency or operational range of the turbocharger. Variable geometry turbochargers have been configured to address this need. A type of such variable geometry turbocharger is one having a variable exhaust nozzle, referred to as a variable nozzle turbocharger. Different configurations of variable nozzles have been employed in variable nozzle turbochargers to control the exhaust gas flow. One approach taken to achieve exhaust gas flow control in such variable nozzle turbochargers involves the use of multiple pivoting vanes that are positioned annularly around the turbine inlet. The pivoting vanes are commonly controlled to alter the throat area of the passages between the vanes, thereby functioning to control the exhaust gas flow into the turbine.

In order to ensure the proper and reliable operation of such variable nozzle turbochargers, it is important that the individual vanes be configured and assembled within the turbine housing to move or pivot freely in response to a desired exhaust gas flow control actuation. FIG. 1 illustrates a prior art vane 10 used in such turbocharger application, comprising an outer airfoil surface 12, and inner airfoil surface 14, and opposed axial surfaces 16 and 18. This type of vane is one having a "solid" construction because the vane axial surfaces 16 and 18 are defined by a continuous planar or flat structure.

While such conventional solid vanes 10 are useful in variable geometry turbochargers, the solid design of the vanes is known to make vane mobility within the turbocharger more difficult, and is known to impose related friction effects on the vanes and related vane movement mechanisms within the turbocharger that can reduce operational service life of the turbocharger. Additionally, the cost associated with using solid vanes is relatively expensive.

FIGS. 2A and 2B each illustrate another prior art vane 20 that is constructed having a non-solid construction. Specifically, such prior art vane 20 is configured having axial surfaces 22 and 24 that, unlike the solid vane discussed above, have axial surfaces that are substantially cored or hollowed-out.

As illustrated in FIG. 2A, vane axial surface 22 is defined by two cored-out sections 26 and 28 that together occupy a major portion of the axial surface area. The vane axial surface 22 includes a solid section 30, that is disposed between the two cored-out sections 26 and 38, and that represents a minor portion of the axial surface area. As illustrated in FIG. 2B, vane axial surface 24 is defined by two cored-out sections 32 and 34 that together occupy a major portion of the of the axial surface area. The vane axial surface 24 includes an opening 36 disposed between the two cored-out sections, and is positioned opposite from the solid section 30 of the opposed vane axial surface 22.

This prior art cored-out vane is useful in providing a vane structure having reduced weight, thereby reducing the effort and frictional wear associated with moving vanes of this construction within a turbocharger, and having a reduced expense. However, the cored-out structure of such vanes may operate to permit undesired air flow effects to occur within the turbocharger. For example, the cored-out vane axial surfaces may operate to provide a leak path for air directed onto the vane's airfoil surfaces. For example, air being directed to the vane leading edge and airfoil surfaces, rather then being directed along the airfoil surfaces, can leak between the vane axial surfaces and adjacent turbocharger surfaces due to the reduced resistance to airflow that is provided by the core-out configuration. Such vane leakage within the turbocharger is not desired as it adversely impacts turbocharger operating efficiency.

It is, therefore, desired that a vane be constructed for use within a variable geometry turbocharger that has a reduced weight, when compared to a conventional solid construction vane, and that minimizes or eliminates unwanted airflow effects within the turbocharger associated with air leakage across the vane, thereby providing improved vane operational reliability and turbocharger efficiency.

SUMMARY OF THE INVENTION

Vanes of this invention are disposed within a variable geometry turbocharger assembly that comprises a turbine housing having an exhaust gas inlet and an outlet, a volute connected to the inlet, and a nozzle wall adjacent the volute. A turbine wheel is carried within the turbine housing and is attached to a shaft. A plurality of such vanes are disposed within the turbine housing between the exhaust gas inlet and turbine wheel.

Vanes of this invention comprise an inner airfoil surface oriented adjacent the turbine wheel, and an outer airfoil surface oriented opposite and generally parallel to the inner airfoil surface. First and second axial surfaces are each positioned perpendicular to and interposed between the inner and outer airfoil surfaces. A vane leading edge is positioned along a first inner and outer airfoil surface junction. A vane trailing edge is positioned along a second inner and outer airfoil surface junction. Vanes of this invention also includes a hole disposed within at least one of the first and second axial surfaces for receiving a post therein.

A key feature of vanes of this invention is that at least one of the first and second axial surfaces comprises a composite construction of a solid section and a cored-out section. In an example embodiment, the solid section extends a distance from the leading edge towards the trailing edge, and the cored-out section extends a distance from the trailing edge towards the leading edge. The solid and cored-out sections are positioned and configured to minimize or eliminate the undesired passage of gas along the vane axial surface, thereby operating to increase turbocharger operating efficiency.

BRIEF DESCRIPTION OF THE DRAWINGS

The invention will be more clearly understood with reference to the following drawings wherein.

DETAILED DESCRIPTION OF THE INVENTION

Vanes of this invention, constructed for use in a variable geometry turbocharger, are configured having axial surfaces that are each characterized by strategically positioned cored-out and solid surfaces. More specifically, vanes of this invention have a first axial surface that is solid along a major surface area, and a second axial surface that is cored-out along a major surface area. Each of the first and second axial surfaces also include respective cored-out and solid sections that occupies a minor surface area of the respective axial surface. Vanes of this invention are so configured to minimize or eliminate possible leak paths across the vane axial surfaces during turbocharger operation.

Vanes of this invention are disposed within a variable geometry or variable nozzle turbocharger. Such variable geometry turbochargers generally comprise a center housing having a turbine housing attached at one end, and a compressor housing attached at an opposite end. A shaft is rotatably disposed within a bearing assembly contained within the center housing. A turbine or turbine wheel is attached to one shaft end and is carried within the turbine housing, and a compressor impeller is attached to an opposite shaft end and is carried within the compressor housing. The turbine and compressor housings are attached to the center housing by, for example, bolts that extend between the adjacent housings.

Figure 1:
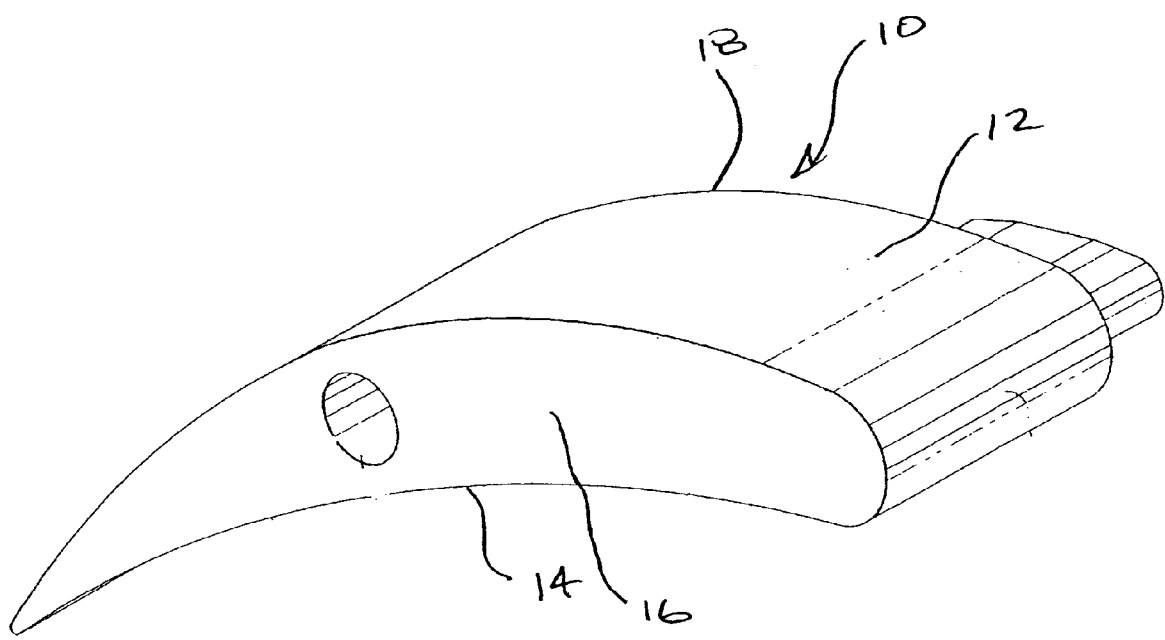
FIG. 1 is a perspective view of a prior art solid vane.
Figure 2A:
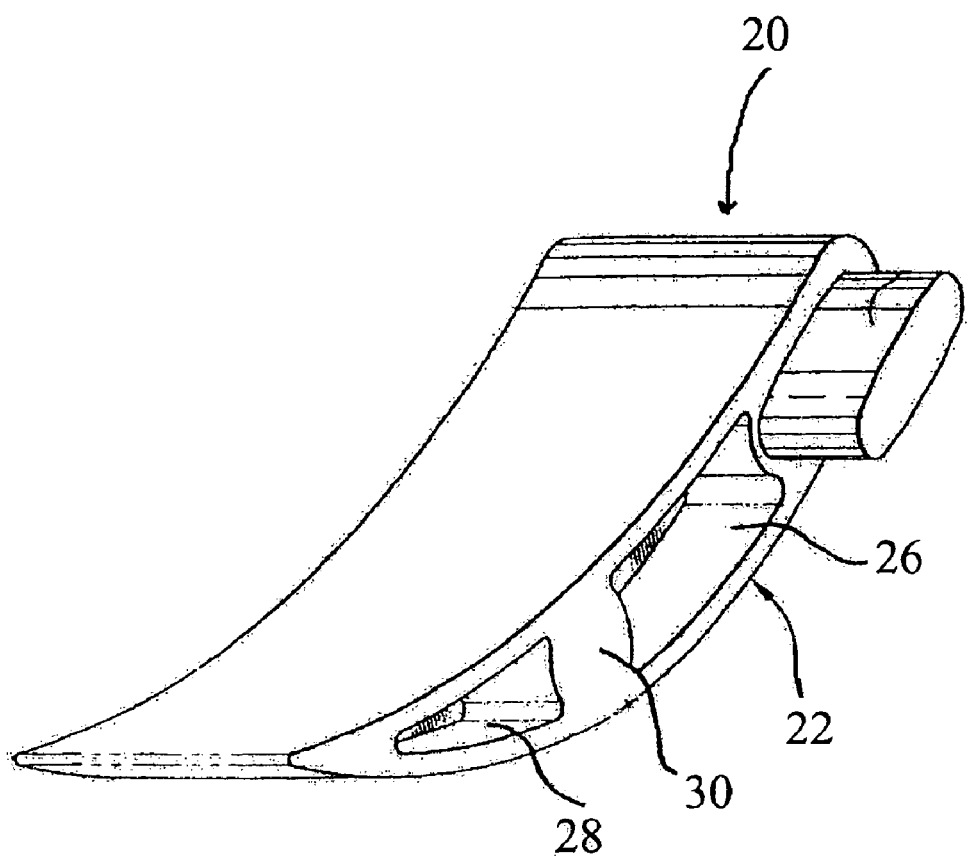
FIGS. 2A and 2B are perspective views of a prior art cored-out vane.
Figure 2B:
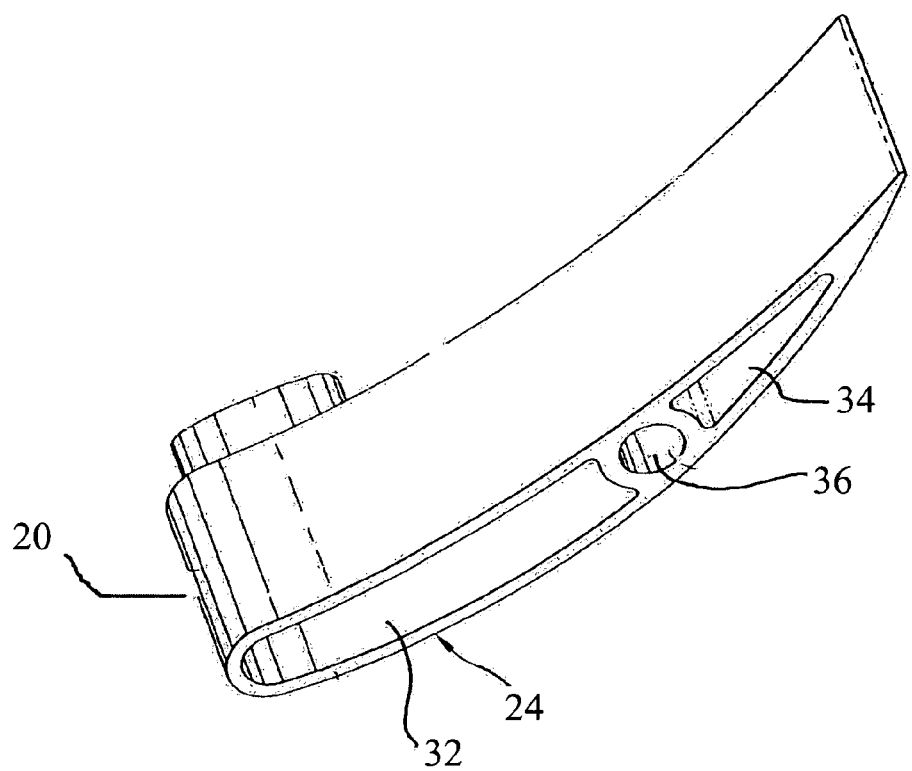
Figure 3:
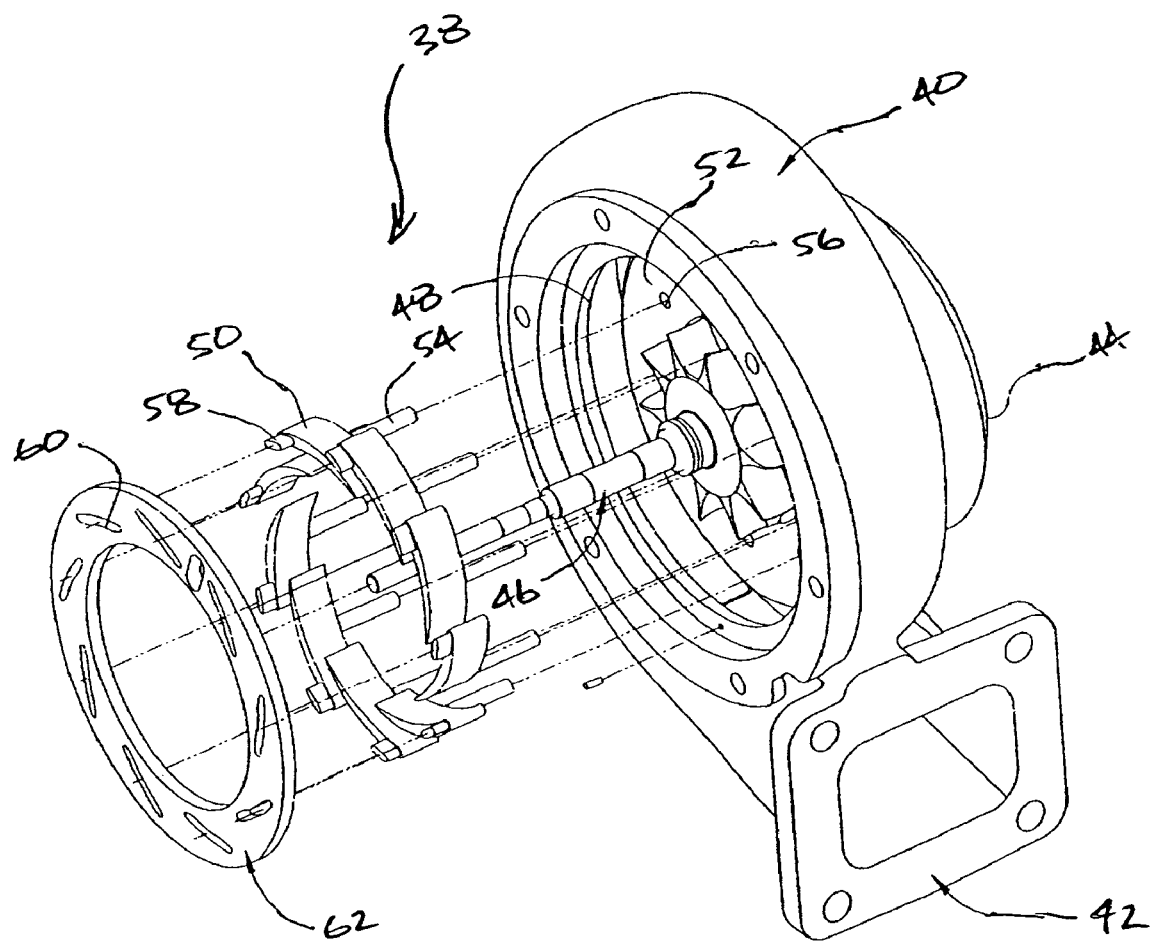
FIG. 3 is an exploded isometric view of a turbine housing for a variable geometry turbocharger employing conventional vanes.

FIG. 3 illustrates a portion of a known variable nozzle turbocharger 38 comprising a turbine housing 40 having a standard inlet 42 for receiving an exhaust gas stream, and an outlet 44 for directing exhaust gas to the exhaust system of the engine. A volute is connected to the exhaust inlet and an outer nozzle wall is incorporated in the turbine housing casting adjacent the volute. A turbine wheel and shaft assembly 46 is carried within the turbine housing. Exhaust gas, or other high energy gas supplying the turbocharger, enters the turbine through the inlet and is distributed through the volute in the turbine housing for substantially radial entry into the turbine wheel through a circumferential nozzle entry 48.

Multiple vanes 50 are mounted to a nozzle wall 52 by shafts 54 that project perpendicularly therebetween. The shafts are disposed within respective openings 56 in the nozzle wall. The vanes each include actuation tabs 58 that project from a side opposite the shafts and that are engaged by respective slots 60 in a unison ring 62, which acts as a second nozzle wall.

An actuator assembly is connected with the unison ring and is configured to rotate the ring in one direction or the other as necessary to move the vanes radially, with respect to an axis of rotation of the turbine wheel, outwardly or inwardly to respectively increase or decrease the flow of exhaust gas to the turbine. As the unison ring is rotated, the vane tabs 58 are caused to move within their respective slot 60 from one slot end to an opposite slot end. Since the slots are oriented with a radial directional component along the unison ring, the movement of the vane tabs within the respective slots causes the vanes to pivot via rotation of the vane shafts within their respective openings and open or close the nozzle area depending on the unison ring rotational direction. An example of known variable nozzle turbochargers comprising such elements is disclosed in U.S. Pat. Nos. 6,269,642 and 6,419,464, which are incorporated herein by reference.

As mentioned above in the background, proper operation of variable geometry turbochargers, comprising the arrangement of multiple vanes described above and illustrated in FIG. 3, requires that the vanes be configured to facilitate both desired vane movement in a manner that does not produce excessive frictional wear, e.g., be of a lightweight design, and efficient flow of gas within the turbine housing, e.g., not promote gas flow leakage.

Figure 4A:
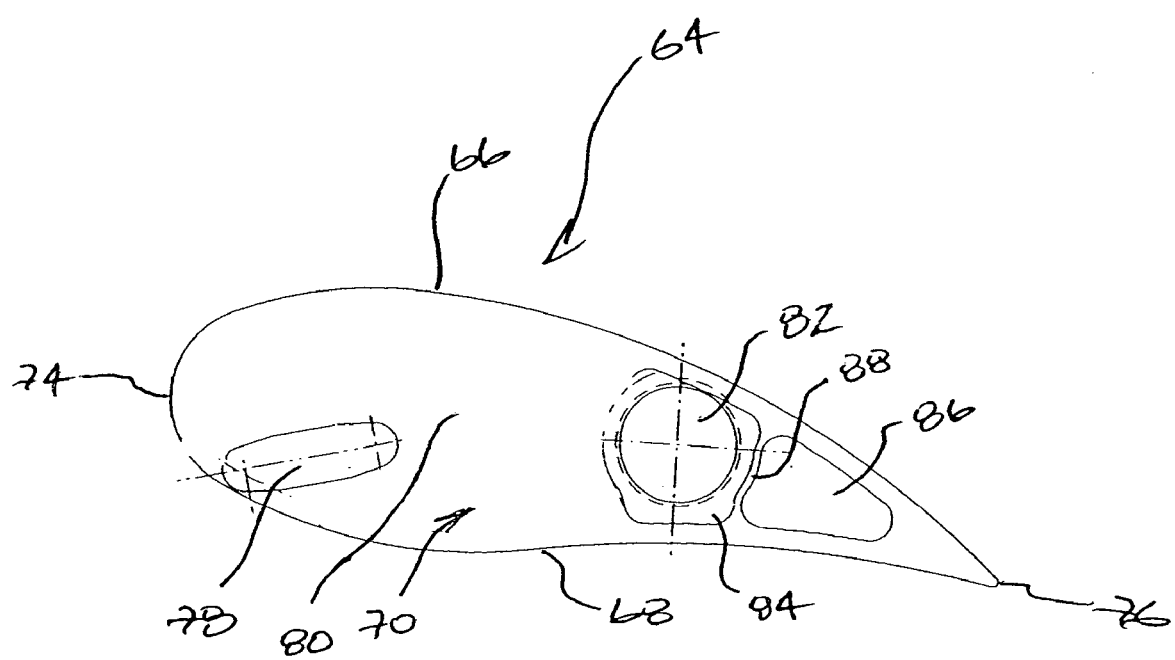
FIGS. 4A and 4B are side views of a vane constructed in accordance with this invention.
Figure 4B:
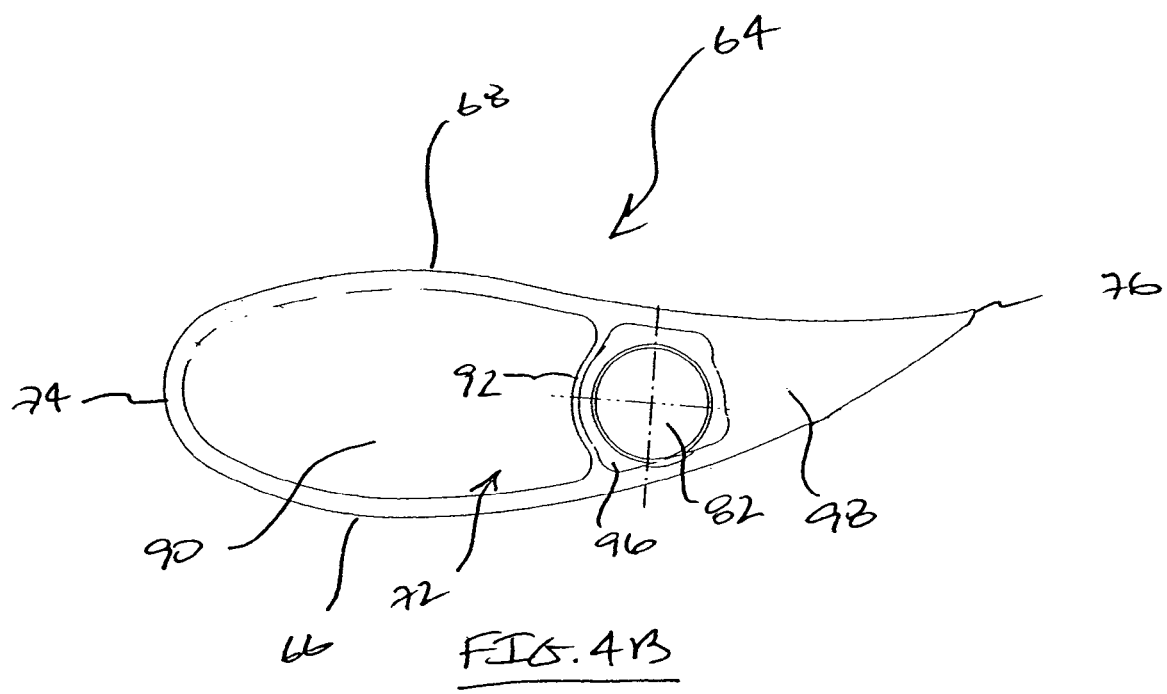
Figure 5:
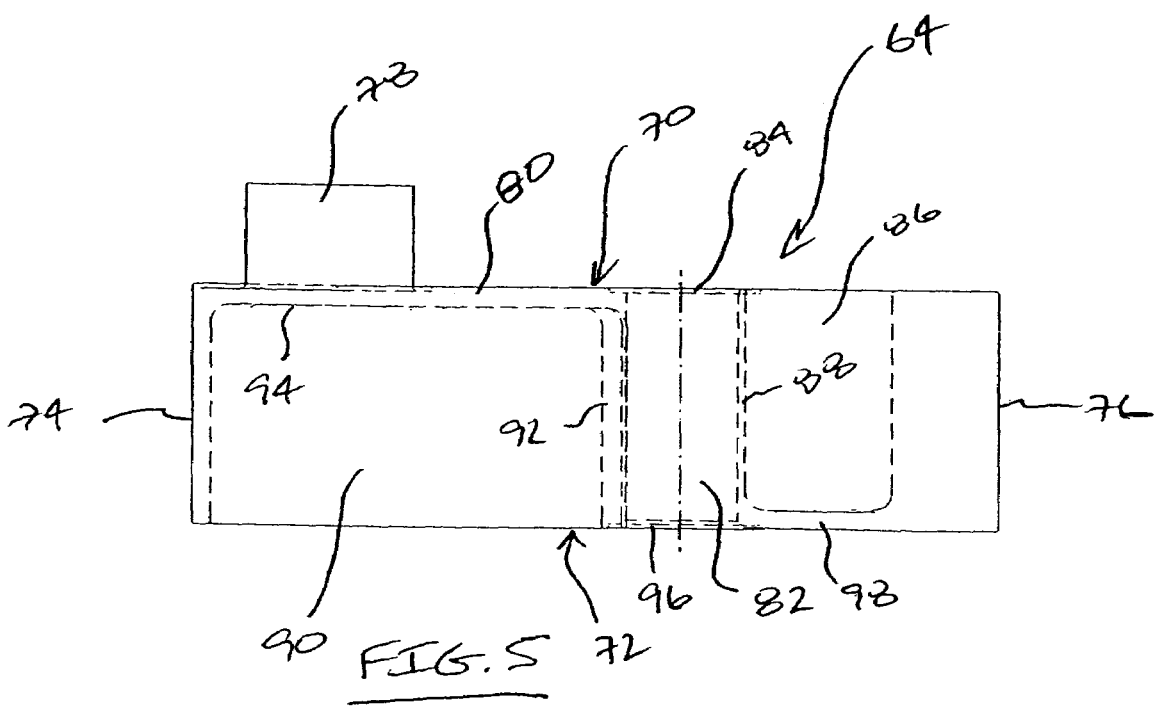
FIG. 5 is a horizontal cross-sectional view of the vane of FIGS. 4A and 4B.

FIGS. 4A and 4B illustrate an example embodiment vane 64 of this invention that has been specially designed for application within a variable geometry turbocharger, such as that described above and illustrated in FIG. 3, to address all of these needs. FIG. 5 also shows a horizontal cross section of the vane for purposes of providing further reference for those vane elements discussed below. Referring to FIGS. 4A and 5, the vane 64 includes an outer or low-pressure airfoil surface 66, an opposite inner or high-pressure airfoil surface 68, and axial surfaces 70 and 72 (shown in FIG. 4B). These vane surfaces are defined relative to the vane placement within the turbine housing. The vane 64 includes a leading edge 74 and a trailing edge 76 at opposite common ends of the low and high pressure airfoil surfaces 66 and 68. The vane includes a tab 78 that is positioned adjacent the leading edge 74, and that projects outwardly away from the axial surface 70. The tab 78 is configured to cooperate with a unison ring slot in the manner described above to facilitate vane actuation.

Vanes of this invention can comprise airfoil surface configurations other than that disclosed and illustrated above. In a preferred embodiment, vanes of this invention can have an airfoil or radial thickness (as measured between opposed outer and inner airfoil surfaces) that can be greater than about 0.16 the length of the vane, e.g., in the range of from about 0.16 to 0.50 the length of the vane (as measured by a straight line between the vane leading and trailing edges). Additionally, the outer airfoil surface can comprise a convex surface having a radius of curvature that is less than about 0.8 times a length of the vane. Further, the vane leading edge is characterized by having relatively large radius of curvature such that an adjacent portion of the outer airfoil surface is located a relatively great distance from the actuation tab, thereby operating to provide an increased thickness adjacent the leading edge.

Additionally, rather than having a continuous convex shape (i.e., defined by a single radius of curvature), the inner airfoil surface can have a complex shape that is defined by at least two differently shaped sections. Moving from the leading edge, the inner airfoil surface has a convex-shaped portion defined by a radius of curvature that is greater than that of the leading edge to contour or blend the leading edge into the inner surface. The convex-shaped portion extends from the leading edge 74 to just past the tab 78. Moving from the convex-shaped portion, the inner surface has a concave-shaped portion that extends to the vane trailing edge.

The vane axial surface 70 comprises a composite construction of both solid and cored-out surface sections that are specifically positioned to avoid unwanted gas flow leakage along the axial surface. As used herein, the term solid is used to refer to the fact that the designated surface portion is flat or planar, and is not recessed relative to the bounding edges of the inner and outer airfoil surfaces. In this example embodiment, the vane axial surface 70 comprises a solid section 80 that extends between the outer and inner airfoil surfaces 66 and 68, from the vane leading edge 74 to a shaft opening 82. The tab 78 projects from this solid section 80, and the solid section occupies a substantial surface area of the axial surface 70. In an example embodiment, the solid section occupies greater than about 25 percent, preferably greater than about 50 percent, and more preferably greater than 55 percent, of the axial surface area.

For vanes placed into operation within the variable geometry turbocharger described above and illustrated in FIG. 3, the portion of the vane axial surface 70 that is exposed to high pressure differential within the turbocharger, and the portion of the vane most subject to gas leakage, is the portion of the vane that corresponds to the overlay of the unison ring and, more specifically, the overlay of the unison ring slots. It is theorized that high pressure gas can be directed through the unison ring via the slots and onto the vane axial surface. For this reason, the axial surface 70 is configured having the solid section 80 positioned to correspond with the unison ring slot to minimize the leak path for any high pressure gas being passed through the slot.

The opening 82 is configured to accept placement of a shaft therein to permit pivoting vane movement within the turbocharger. In an example embodiment, the opening 82 extends completely through the vane and comprises a recessed surface section 84 positioned concentrically therearound. The recessed surface section 84 operates to facilitate flattening operations such as coining. A tight flatness tolerance on the axial face 70 of the vane is important for the purpose of reducing leak paths, and addressing associated efficiency losses.

The vane axial surface 70 comprises a hollow or cored-out section 86 that extends from a wall 88, defining a portion of the shaft opening 82, a distance towards the trailing edge 76. The cored-out section 86 is defined by opposite inside walls of the outer and inner airfoil surfaces. The cored-out section 86 occupies a minor surface area of the axial surface 70. In an example embodiment, the cored-out section 86 occupies less than about 40 percent, and preferably less than 35 percent, of the axial surface area.

For vanes placed into operation with the variable geometry turbocharger described above and illustrated in FIG. 3, the portion of the vane axial surface 70 that is exposed to a relatively low pressure differential is the portion of the vane extending from the shaft opening 82 to the trailing edge. For this reason, the potential for gas leakage is reduced and it is beneficial for purposes of reducing cost and rotating mass to construct this section having a cored-out configuration.

FIG. 4B illustrates another view of the vane 64 from the other axial surface 72. Axial surface 72 comprises a composite construction of both solid and cored-out surface sections that, like the axial surface 70, are specifically positioned to avoid unwanted gas flow leakage thereacross. Features of this vane axial surface are also shown in FIG. 5. In this example embodiment, the vane axial surface 72 comprises a hollow or cored-out section 90 that extends between the outer and inner airfoil surfaces 66 and 68, from the vane leading edge 74 to the shaft opening 82.

More specifically, the cored-out section 90 is defined by opposite inside walls of the outer and inner airfoil surfaces, and by a wall section 92 that defines the shaft opening 82 extending through the vane. As best illustrated in FIG. 5, in an example embodiment, the cored-out section 90 has a depth defined by an inside wall portion 94 of the solid section 80 disposed along the opposite axial surface 70. The cored-out section 90 occupies a portion of the axial surface 72 that is substantially similar or equal to the portion of the axial surface 70 occupied by the solid section 80. In such example embodiment, the cored-out section 90 occupies a substantial surface area of the axial surface 72, e.g., occupying greater than about 50 percent, and preferably greater than 55 percent, of the axial surface area.

As with the axial surface 70, the axial surface 72 includes a recessed surface section 96 positioned concentrically around the shaft opening 82. The recessed surface section 96 operates to facilitate flattening operations such as coining. A tight flatness tolerance on the axial face 72 of the vane is important for the purpose of reducing leak paths, and reducing associated efficiency losses.

The vane axial surface 72 further comprises a solid section 98 that extends from the shaft opening 82, a distance towards the trailing edge 76. The solid section 98 is defined by the outer and inner airfoil surfaces, and occupies a minor surface area of the axial surface 72. The solid section 98 occupies a portion of the axial surface 72 that is substantially similar or equal to the portion of the axial surface 70 occupied by the cored-out section 86. In an example embodiment, the solid section 98 occupies less than about 40 percent, and preferably less than 35 percent, of the axial surface area.

For vanes placed into operation within the variable geometry turbocharger described above and illustrated in FIG. 3, the portion of the vane axial surface 72 that is exposed to high pressure differential within the turbocharger, and the portion of the vane most subject to gas leakage, is the portion of the vane that is adjacent the trailing edge. This portion of the vane was found, through experimentation, to measurably impact turbine efficiency. For this reason, the axial surface 72 is configured having the solid section 98 positioned between the hole and the trailing edge to minimize the leak path for any high pressure gas. Additionally, the portion of the vane axial surface 72 that is exposed to a relatively low pressure differential is the portion of the vane extending from the leading edge to the shaft opening 82. This portion of the vane's axial surface slides along an uninterrupted, smooth, planar nozzle face, where no source of high pressure gas is present to generate substantial leak flow. For this reason, the potential for gas leakage is reduced and it is beneficial for purposes of reducing cost and rotating mass to construct this section having a cored-out configuration.

Vanes of this invention are intentionally configured having with axial surface sections comprising a composite of solid and cored-out sections. In a preferred embodiment, the solid and cored-out sections are positioned on one vane axial surface opposite from respective cored-out and solid sections on the other vane axial surface. In such preferred embodiment, the solid and cored-out sections are located adjacent the vane leading or trailing edges. Vanes of this invention, configured in the manner described and illustrated above, minimize leakage of gas between vane axial surfaces and adjacent turbocharger surfaces, when placed into use within a turbocharger assembly illustrated in FIG. 3, by providing a minimized leak path of solid and cored-out portions along each axial surface.

However, it is to be understood that vanes of this invention can comprise axial surfaces having composite constructions of solid and cored-out sections that are arranged differently than described and illustrated, depending on the particular turbocharger configuration and turbocharger application. For example, vanes of this invention may have the solid and cored-out sections positioned differently along the axial surfaces to address differently positioned high pressure differentials within the turbocharger. A key feature of this invention is that at least one of the vane axial surfaces comprise a composite of cored-out and solid sections.

Vanes of this invention can be formed from the same types of materials used to form conventional prior art vanes. Vanes of this invention can be formed by machining or molding process. In a preferred embodiment, vanes of this invention are formed by metal injection molding technique. Vanes of this invention provide a desired a cost effective and light weight alternative to solid vanes, while at the same time minimizing or eliminating undesired gas leakage effects within the turbocharger. Thus, vanes of this invention operate to improve vane mobility, reduce frictional wear effects, improve turbocharger operational efficiency, and extend turbocharger operational service life.

Having now described the invention in detail as required by the patent statutes, those skilled in the art will recognize modifications and substitutions to the specific embodiments disclosed herein. Such modifications are within the scope and intent of the present invention.

What is claimed is:

1. A variable geometry turbocharger assembly comprising:
    a turbine housing having an exhaust gas inlet and an outlet, a volute connected to the inlet, and a nozzle wall adjacent the volute;
    a turbine wheel carried within the turbine housing and attached to a shaft;
    a plurality of vanes disposed within the turbine housing between the exhaust gas inlet and turbine wheel, each vane comprising:
        an inner airfoil surface oriented adjacent the turbine wheel;
        an outer airfoil surface oriented opposite and parallel to the inner airfoil surface;
        first and second axial surfaces each positioned perpendicular to and interposed between the inner and outer airfoil surfaces;
        a leading edge positioned along a first inner and outer airfoil surface junction;
        a trailing edge positioned along a second inner and outer airfoil surface junction;
    wherein each of the first and second axial surfaces comprises a composite construction of a solid section and a cored-out section, wherein each vane further comprises an opening within at least one of the first and second axial surfaces for accommodating a post, wherein the solid section of one of the first and second axial surface extends from the leading edge to the opening, and wherein the cored-out section of the same one of the first and second axial surface extends from the opening to the trailing edge.

2. The assembly as recited in claim 1 wherein the solid section of the first axial surface is positioned opposite from the cored-out section of the second axial surface.

3. A variable geometry turbocharger assembly comprising:
    a turbine housing having an exhaust gas inlet and an outlet, a volute connected to the inlet, and a nozzle wall adjacent the volute;
    a turbine wheel carried within the turbine housing and attached to a shaft;
    a plurality of vanes disposed within the turbine housing between the exhaust gas inlet and turbine wheel, each vane comprising:
        an inner airfoil surface oriented adjacent the turbine wheel;
        an outer airfoil surface oriented opposite and parallel to the inner airfoil surface;
        first and second axial surfaces each positioned perpendicular to and interposed between the inner and outer airfoil surfaces;
        a leading edge positioned along a first inner and outer airfoil surface junction;
        a trailing edge positioned along a second inner and outer airfoil surface junction;
    wherein each of the first and second axial surfaces comprises a composite construction of a solid section and a cored-out section, wherein the solid section of one of the first and second axial surface occupies at least 25 percent of the axial surface area extending from the leading edge towards the trailing edge, wherein the cored-out section for the same one of the first and second axial surface extends from the trailing edge towards the leading edge, and wherein the solid section of the first axial surface is positioned opposite from the cored-out section of the second axial surface.

4. The assembly as recited in claim 3 wherein each vane further comprises an opening within at least one of the first and second axial surfaces for accommodating a post, and wherein the solid section extends from the leading edge to the opening, and the cored-out section extends from the hole to a position adjacent the trailing edge.

5. The assembly as recited in claim 3 wherein the solid section occupies greater than 50 percent of the surface area of the first axial surface.

6. The assembly as recited in claim 3 further comprising a tab projecting outwardly from the solid section and positioned adjacent the leading edge.

7. A variable geometry turbocharger assembly comprising:
    a turbine housing having an exhaust gas inlet and an outlet, a volute connected to the inlet, and a nozzle wall adjacent the volute;
    a turbine wheel carried within the turbine housing and attached to a shaft;
    a plurality of vanes disposed within the turbine housing between the exhaust gas inlet and turbine wheel, each vane comprising:
        an inner airfoil surface oriented adjacent the turbine wheel;
        an outer airfoil surface oriented opposite and parallel to the inner airfoil surface;
        first and second axial surfaces each positioned perpendicular to and interposed between the inner and outer airfoil surfaces;
        a leading edge positioned along a first inner and outer airfoil surface junction;

a trailing edge positioned along a second inner and outer airfoil surface junction;

wherein each of the first and second axial surfaces comprises a composite construction of a solid section and a cored-out section, wherein each vane further comprises an opening for accommodating a post and that extends through the vane from the first axial surface to the second axial surface, wherein the solid section of the first and second axial surface occupies at least 25 percent of the axial surface area, wherein the first axial surface comprises the solid section extending from the leading edge to the opening, and the cored-out section extending from the opening to a position adjacent the trailing edge, and wherein the second axial surface comprises the cored-out section extending from the leading edge to the opening, and the solid section extending from the opening to the trailing edge.

8. The assembly as recited in claim 7 wherein the first axial surface solid section occupies a major surface area of the first axial surface, and the second axial surface cored-out section occupies a major surface area of the second axial surface.

9. The assembly as recited in claim 7 further comprising a tab projecting outwardly from the first axial surface and positioned adjacent the leading edge.

10. A variable geometry turbocharger assembly comprising:
- a turbine housing having an exhaust gas inlet and an outlet, a volute connected to the inlet, and a nozzle wall adjacent the volute;
- a turbine wheel carried within the turbine housing and attached to a shaft;
- a plurality of vanes disposed within the turbine housing between the exhaust gas inlet and turbine wheel, each vane comprising:
  - an inner airfoil surface oriented adjacent the turbine wheel;
  - an outer airfoil surface oriented opposite and parallel to the inner airfoil surface;
  - first and second axial surfaces perpendicular to and interposed between the inner and outer airfoil surfaces, wherein the second axial surface is positioned adjacent the nozzle wall;
  - a leading edge positioned along a first inner and outer airfoil surface junction;
  - a trailing edge positioned along a second inner and outer airfoil surface junction;
  - an opening disposed through the second axial surface for accommodating a post therein that is interposed between the vane and the nozzle wall; and
  - actuating means positioned on the first axial surface;
- an annular unison ring positioned adjacent the vanes along the first axial surface and comprising means for cooperating with the actuating means to engage the plurality of vanes to rotate the vanes within the turbocharger;

wherein each of the first and second axial surfaces comprises a composite construction of a solid section and a cored-out section, wherein the solid section occupies at least 25 percent of the surface area of at least one of the first and second axial surfaces, and wherein the solid section extends along the first axial surface from the leading edge to a position adjacent the opening in the second axial surface, and the solid section extends along the second axial surface from the opening to the trailing edge.

11. The assembly as recited in claim 10 wherein the cored-out section extends along the first axial surface from a position adjacent the trailing edge to a position adjacent the opening in the second axial surface, and the cored-out section extends along the second axial surface from the leading edge to a position adjacent the opening.

12. The assembly as recited in claim 10 wherein the solid section of the at least one of the first and second axial surfaces occupies at least 50 percent of the surface area of such axial surface as measured between the leading and trailing edges.

13. The assembly as recited in claim 10 wherein the actuating means is a tab that projects outwardly from the vane, and the cooperating means is a slot.

* * * * *